D. C. HULL.

Manufacture of Whip-Stocks.

No. 5,651. Reissued Nov. 11, 1873.

Witnesses.

S. N. Pipe

L. N. Höller

David C Hull by his attorney

R. H. Eddy

AM. PHOTO-LITHOGRAPHIC Co. N.Y. (OSBORNE'S PROCESS)

UNITED STATES PATENT OFFICE.

DAVID C. HULL, OF WESTFIELD, MASSACHUSETTS.

IMPROVEMENT IN THE MANUFACTURE OF WHIP-STOCKS.

Specification forming part of Letters Patent No. 132,909, dated November 12, 1872; reissue No. 5,651, dated November 11, 1873; application filed September 3, 1873.

*To all whom it may concern:*

Be it known that I, DAVID C. HULL, of Westfield, of the county of Hampden and State of Massachusetts, have invented a new and useful Improvement in Whip-Stocks, or in the manufacture thereof; and I do hereby declare the same to be fully described in the following specification and represented in the accompanying drawings, of which—

Figure 1:
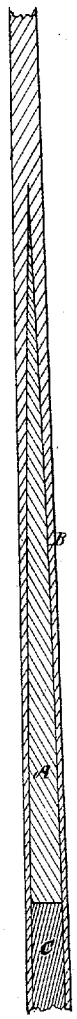
Figure 3:
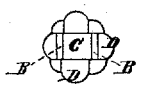
Figure 2:
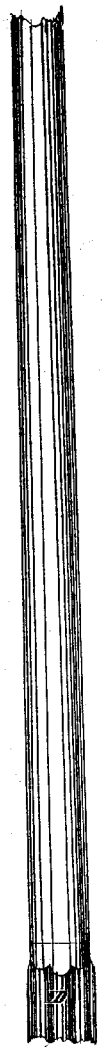

Figure 1 denotes a longitudinal section of the split or forked wooden heart-piece, the metallic wedge or load, and the wooden backing, as arranged and applied in the formation of a whip-stock in accordance with my improvement. Fig. 2 is a butt-end view, and Fig. 3 is a side view, of the stock as it is when taken from the turning-machine.

In the common way heretofore practiced for making a whip-stock of pieces of rattan and a metallic load, the pieces of wood were arranged around the load-piece, with their butts even, or about so, with each other, in consequence of which the part at the butt of the stock held or grasped by the chuck of the turning-machine could not be turned thereby, but had subsequently to be reduced by other means.

In carrying out my invention or improvement, I extend the rattan strips surrounding the metallic load-piece rearward beyond such load-piece a sufficient distance to constitute of themselves, or with a backing or plug of wood placed in the cavity made by them in rear of the said load-piece, a "stump-shod," such being for the purpose of allowing the butt of the whip-stock to be properly held in and turned by a turning-machine, and the superfluous material to be removed by a saw or other proper tool.

In Fig. 1 of the drawing, the metallic wedge or load piece is shown at A as arranged within the split or furcated heart-piece B of rattan or whalebone, the wooden backing being represented at C as being a short prism or cylinder of wood arranged between the prongs of the heart-piece and against the butt of the load-piece, the whole being glued together. On the parts so combined the side strips D of rattan are to be all laid and cemented or glued, after which the whole is to be turned round and tapering to the dimensions required by a turning-machine. The portion held by the holder or chuck of the machine, being shorter than the backing, can, with part of the backing, be sawed off, thereby saving the necessity of reducing the chucked portion in the ordinary way.

I am aware that in turning an article it has been customary to use a blank longer than the article, and to afterward remove the surplus at either or each end of the article. Such, however, constitutes no part of my invention, but is only incident to it in the matter of reduction of it or the whip-stock. I therefore make no claim to such a process of turning an article from a blank longer than the article, and subsequently removing the surplus at either or each end of the article.

The extension of the rattan strips D rearward beyond the load-piece, with or without the plug or prism, is a matter of my invention. Although the extension alone without the load-piece makes a stump-shod, which can be used in holding the stock in the chuck of the turning-machine, the addition of the plug makes the stump-shod stronger and not liable to cripple or give away under the action of the machine.

I claim—

1. A whip-stock composed of a series of rattan strips, D, a heart-piece, B, and a metallic load-piece, A, arranged as set forth, and having the rattan strips surrounding such load-piece, and extended rearward beyond it, substantially as specified.

2. A whip-stock composed of a series of rattan strips, D, a heart-piece, B, a metallic load-piece, A, and a separate wooden backing or plug, C, all arranged substantially as described, and being in order that the butt of the stock may be held and finished by a turning-machine, and the supporting material or surplus portion of such butt be subsequently removed by a saw or other means without interference from the metallic load-piece.

DAVID C. HULL.

Witnesses:

ANDREW L. BUSH,
T. C. PARKS.